No. 754,990. PATENTED MAR. 22, 1904.
J. GEERY.
HAY RAKE ATTACHMENT.
APPLICATION FILED JUNE 10, 1903.
NO MODEL.
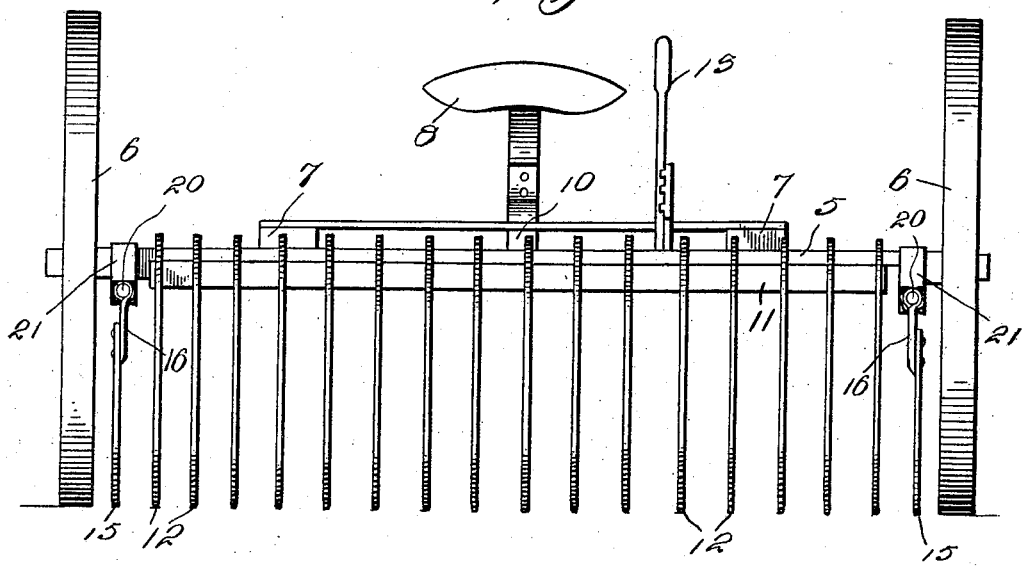
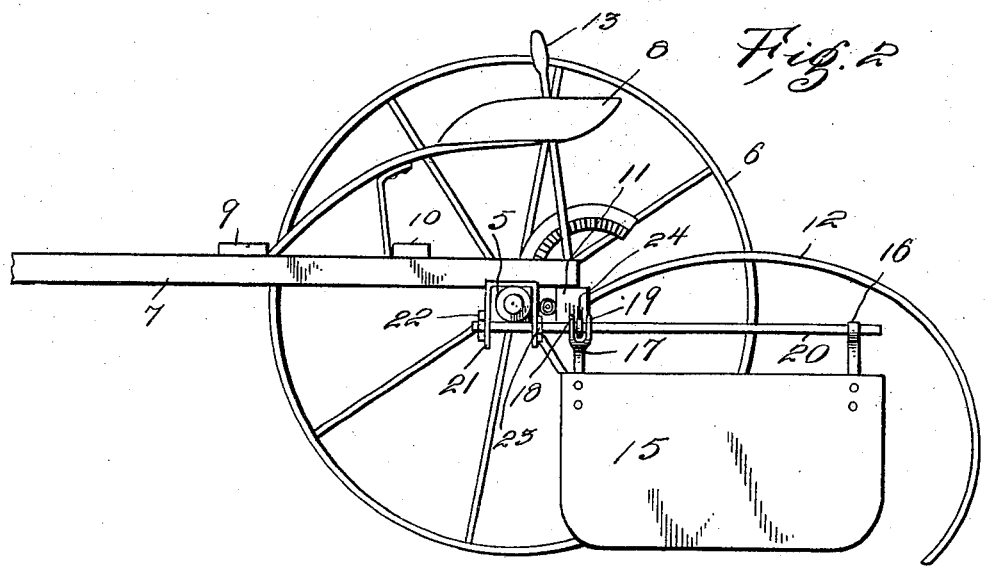
Witnesses
Inventor
James Geery
By Chandler & Chandler
Attorneys No. 754,990. Patented March 22, 1904.

UNITED STATES PATENT OFFICE.

JAMES GEERY, OF WISDOM, MONTANA.

HAY-RAKE ATTACHMENT.

SPECIFICATION forming part of Letters Patent No. 754,990, dated March 22, 1904.

Application filed June 10, 1903. Serial No. 160,787. (No model.)

*To all whom it may concern:*

Be it known that I, JAMES GEERY, a citizen of the United States, residing at Wisdom, in the county of Beaverhead, State of Montana, have invented certain new and useful Improvements in Hay-Rake Attachments; and I do hereby declare the following to be a full, clear, and exact description of the invention, such as will enable others skilled in the art to which it appertains to make and use the same.

This invention relates to hay-rakes; and it has for its object to provide an attachment which will prevent the hay passing from the ends of the rake to the wheels, it being well known that in the operation of a hay-rake as soon as the rake begins to fill there is a tendency of the hay to crowd longitudinally of the rake and off from the ends thereof against the wheels, by which latter it is caught and drawn from the rake and strewn over the field. With the present arrangement the hay is kept from the wheels, while the attachments themselves are so arranged as to move freely past any obstructions that may be encountered.

In the drawings forming a portion of this specification, in which like numerals of reference indicate similar parts in the several views, Figure 1 is a rear view of a hay-rake provided with attachments embodying the present invention. Fig. 2 is a side elevation of a rake with one wheel removed.

Referring now to the drawings, the present fender attachments are connected to the ordinary hay-rake, which latter consists of the axle 5, at the ends of which are the wheels 6. Connected to the axle are the hounds 7, which support the seat 8 through the medium of the cross-pieces 9 and 10. The rake proper comprises a head 11, which carries the tines 12, the head being pivotally mounted and connected with a hand-lever 13, so that it may be rocked to raise and lower the tines.

In the use of a rake such as described there is a tendency for the hay to pass from the ends thereof into the wheels, and to prevent this the present guards are employed. Each of the guards consists of a metal plate 15, from the upper edge of which extend the loops or hangers 16 and 17, the loop or hanger 17 being split longitudinally at its upper end to form the spaced members 18 and 19.

In connection with each of the plates is employed a bar 20, one end of which is engaged through a clip-plate 21, which is disposed over the axle 5, said bar having nuts 22 and 23 thereon which are adjusted to contract the clip-plate upon the axle and at the same time hold the bar securely to the clip-plate. Each of the bars has a collar 24 thereon, and the hangers of the guard-plate are engaged with the bars, one at each end of the rake, the bifurcated hanger of each plate lying with its spaced members at opposite sides of the collar on the bar, so that the plate will be held against displacement longitudinally of the bar, while the hangers permit of a certain amount of vertical movement of the plate.

As illustrated, a plate is hung at each end of the axle between the end of the rake and the adjacent wheel.

In the use of the guard-plates or attachments they hang freely, and if an obstruction is encountered they may swing laterally, so as to pass the obstruction, the outward swing of the plates being limited by the wheels.

What is claimed is—

The combination with a wheeled rake, of rods connected to the axle of the rake and extending rearwardly therefrom, collars rigidly secured to said bars, guard-plates suspended freely from the rods between the wheels and the ends of the rake and projecting rearwardly beyond the wheels to prevent passage of hay from the rake to the wheels, and hangers for supporting the plates, one of said hangers for each plate being split longitudinally at its upper end to form spaced members said members being disposed on opposite sides of the collar.

In testimony whereof I affix my signature in presence of two witnesses.

JAMES GEERY.

Witnesses:
JOHN C. MACKENZIE,
G. W. RICHEY.